United States Patent
Kim et al.

(10) Patent No.: US 12,217,553 B2
(45) Date of Patent: Feb. 4, 2025

(54) TRANSPORT VEHICLE MANAGEMENT METHOD

(71) Applicant: SEMES CO., LTD., Cheonan-si (KR)

(72) Inventors: Tae In Kim, Pyeongtaek-si (KR); Hyun Joon Yoon, Asan-si (KR); Tae Uk Park, Ulsan (KR)

(73) Assignee: SEMES CO., LTD., Cheonan-si (KR)

( * ) Notice: Subject to any disclaimer, the term of this patent is extended or adjusted under 35 U.S.C. 154(b) by 493 days.

(21) Appl. No.: 17/564,685

(22) Filed: Dec. 29, 2021

(65) Prior Publication Data
US 2022/0207925 A1  Jun. 30, 2022

(30) Foreign Application Priority Data
Dec. 30, 2020  (KR) .................... 10-2020-0187750

(51) Int. Cl.
| | |
|---|---|
| G07C 5/00 | (2006.01) |
| B60W 40/12 | (2012.01) |
| B60W 50/02 | (2012.01) |
| G05B 19/418 | (2006.01) |
| G07C 5/08 | (2006.01) |

(52) U.S. Cl.
CPC ............ *G07C 5/006* (2013.01); *B60W 40/12* (2013.01); *B60W 50/0205* (2013.01); *G05B 19/4189* (2013.01); *G07C 5/008* (2013.01); *G07C 5/0816* (2013.01)

(58) Field of Classification Search
CPC ...... G07C 5/006; G07C 5/008; G07C 5/0816; B60W 40/12; B60W 50/0205; G05B 19/4189

USPC ...................................................... 340/685
See application file for complete search history.

(56) References Cited

U.S. PATENT DOCUMENTS

| | | | | |
|---|---|---|---|---|
| 5,746,399 | A * | 5/1998 | Ehrlich | B61L 1/165 |
| | | | | 246/167 R |
| 7,880,767 | B2 * | 2/2011 | Chinigo | G07C 5/085 |
| | | | | 348/148 |
| 2016/0078695 | A1* | 3/2016 | McClintic | G07C 5/0816 |
| | | | | 701/29.4 |
| 2016/0304107 | A1* | 10/2016 | Seaton | B61L 27/57 |
| 2020/0302708 | A1* | 9/2020 | Thompson | G07C 5/0825 |

FOREIGN PATENT DOCUMENTS

| | | |
|---|---|---|
| JP | 2013-23313 | 2/2013 |
| KR | 10-2011-0092665 | 8/2011 |
| KR | 10-2020-0068964 | 6/2020 |

OTHER PUBLICATIONS

Korean Office Action with English translation for Korean Patent Application or Patent No. 10-2020-0187750, dated Jan. 2, 2023.
Chinese Office Action, with English Translation, for Chinese Patent Application No. 202111636568.9, dated Nov. 16, 2023.

* cited by examiner

*Primary Examiner* — Kerri L McNally
(74) *Attorney, Agent, or Firm* — KILE PARK REED & HOUTTEMAN PLLC

(57) ABSTRACT

A transport vehicle management method includes self-testing a transport vehicle to determine whether there is an abnormality in the transport vehicle, checking whether the transport vehicle is capable of self-correcting the abnormality when the abnormality is detected in the transport vehicle, and self-correcting the abnormality when the transport vehicle is capable of self-correcting the abnormality.

16 Claims, 5 Drawing Sheets ately, the present invention relates to a transport vehicle management method of self-correcting an abnormality in a transport vehicle for transporting a material.

TRANSPORT VEHICLE MANAGEMENT METHOD

CROSS-REFERENCE TO RELATED APPLICATION

This application claims the priority benefit of Korean Patent Application No. 10-2020-0187750, filed on Dec. 30, 2020, and all the benefits accruing therefrom under 35 U.S.C. § 119, the contents of which are incorporated by reference in their entirety.

TECHNICAL FIELD

The present invention relates to a transport vehicle management method. More specifically, the present invention relates to a transport vehicle management method of self-correcting an abnormality in a transport vehicle for transporting a material.

BACKGROUND

In general, a material transport apparatus such as an overhead hoist transport (OHT) apparatus may include a plurality of transport vehicles configured to be movable along a transport rail and configured to transport materials.

The transport vehicle may repeatedly perform a movement operation of moving along the transport rail and loading and unloading operations of loading the material onto a load port and unloading the material from the load port, and data on the movement operation and the loading and unloading operations may be acquired by sensors mounted on the transport vehicle.

Meanwhile, when the time taken to perform the movement operation and the loading and unloading operations or values measured by the sensors are different from predetermined reference values, it may be determined that an abnormality has occurred in the transport vehicle.

When an abnormality occurs in the transport vehicle, the transport vehicle may be taken out from the transport rail, and may be returned onto the transport rail after maintenance. However, it may take a lot of time to maintain the transport vehicle as described above.

SUMMARY

Embodiments of the present invention provide a transport vehicle management method capable of self-testing whether a transport vehicle is abnormal and self-correcting the abnormality.

In accordance with an aspect of the present invention, a transport vehicle management method may include self-testing a transport vehicle to determine whether there is an abnormality in the transport vehicle, checking whether the transport vehicle is capable of self-correcting the abnormality when the abnormality is detected in the transport vehicle, and self-correcting the abnormality when the transport vehicle is capable of self-correcting the abnormality.

In accordance with some embodiments of the present invention, the transport vehicle management method may further include transporting a material using the transport vehicle after self-correcting the abnormality.

In accordance with some embodiments of the present invention, the transport vehicle management method may further include transporting a material using the transport vehicle when the abnormality is not detected in the transport vehicle.

In accordance with some embodiments of the present invention, the transport vehicle may be configured to be movable on a transport rail.

In accordance with some embodiments of the present invention, the transport vehicle management method may further include moving the transport vehicle to a self-testing area connected to the transport rail. In such case, the self-testing the transport vehicle may be performed in the self-testing area.

In accordance with some embodiments of the present invention, the transport vehicle management method may further include taking out the transport vehicle from the self-testing area when the abnormality cannot be self-corrected.

In accordance with some embodiments of the present invention, the transport vehicle may include a drive unit configured to be movable on a transport rail, a hand unit for gripping a material, a hoist unit for elevating the hand unit, a slide unit for moving the hoist unit in a horizontal direction, and a frame unit connected to a lower portion of the drive unit and on which the slide unit is mounted to be movable in the horizontal direction.

In accordance with some embodiments of the present invention, at least one selected from the group consisting of a home position and left and right limit adjustment state of the slide unit, a deviation between a home position of the hoist unit and a position of the hoist unit, an operation time and sensor detection state of the hand unit, a distortion and input/output of an obstacle sensor and a front distance sensor mounted on the frame unit, and a sensing distance of the sensors for a movement of the drive unit and loading and unloading of the material, a recognition rate of barcode or QR code of a code reader mounted on the frame unit, and a wear state of drive wheels of the drive unit may be self-tested.

In accordance with some embodiments of the present invention, when a position error of the slide unit is detected by self-testing an operating state of the slide unit, it may be determined that the abnormality has occurred in the transport vehicle.

In accordance with some embodiments of the present invention, a dog bar may be mounted on the slide unit, and a home sensor for detecting the dog bar may be mounted on the frame unit.

In accordance with some embodiments of the present invention, the self-testing the transport vehicle may include measuring a total length of the dog bar using the home sensor while moving the slide unit in the horizontal direction, measuring a left length of the dog bar while moving the slide unit in a right direction from a predetermined home position, and measuring a right length of the dog bar while moving the slide unit in a left direction from the predetermined home position.

In accordance with some embodiments of the present invention, the transport vehicle management method may further include taking out the transport vehicle when the measured total length is different from a predetermined reference length.

In accordance with some embodiments of the present invention, when the measured total length is equal to a predetermined reference length and the measured left length is different from the measured right length, the home position of the slide unit may be corrected so that a left length and a right length of the dog bar are equal to each other.

In accordance with another aspect of the present invention, a transport vehicle may include a drive unit configured to be movable on a transport rail, a hand unit for gripping a material, a hoist unit for elevating the hand unit, a slide unit for moving the hoist unit in a horizontal direction, a frame unit connected to a lower portion of the drive unit and on which the slide unit is mounted to be movable in the horizontal direction, a dog bar mounted on the slide unit, and a home sensor mounted on the frame unit and configured to detect the dog bar, and a transport vehicle management method may include measuring a total length of the dog bar using the home sensor while moving the slide unit in the horizontal direction, and taking out the transport vehicle when the measured total length is different from a predetermined reference length.

In accordance with some embodiments of the present invention, the transport vehicle management method may further include measuring a left length of the dog bar while moving the slide unit in a right direction from a predetermined home position, and measuring a right length of the dog bar while moving the slide unit in a left direction from the predetermined home position.

In accordance with some embodiments of the present invention, the transport vehicle management method may further include transporting the material using the transport vehicle when the measured total length is equal to the predetermined reference length and the measured left length is equal to the measured right length.

In accordance with some embodiments of the present invention, the transport vehicle management method may further include correcting the home position of the slide unit so that a left length and a right length of the dog bar are equal to each other when the measured total length is equal to the predetermined reference length and the measured left length is different from the measured right length.

In accordance with the embodiments of the present invention as described above, when an abnormality occurs in the transport vehicle, the abnormality may be detected by self-test and may then be self-corrected. Accordingly, the time and cost required for managing the transport vehicle may be significantly reduced.

The above summary of the present invention is not intended to describe each illustrated embodiment or every implementation of the present invention. The detailed description and claims that follow more particularly exemplify these embodiments.

BRIEF DESCRIPTION OF THE DRAWINGS

Exemplary embodiments can be understood in more detail from the following description taken in conjunction with the accompanying drawings, in which.

Figure 1:
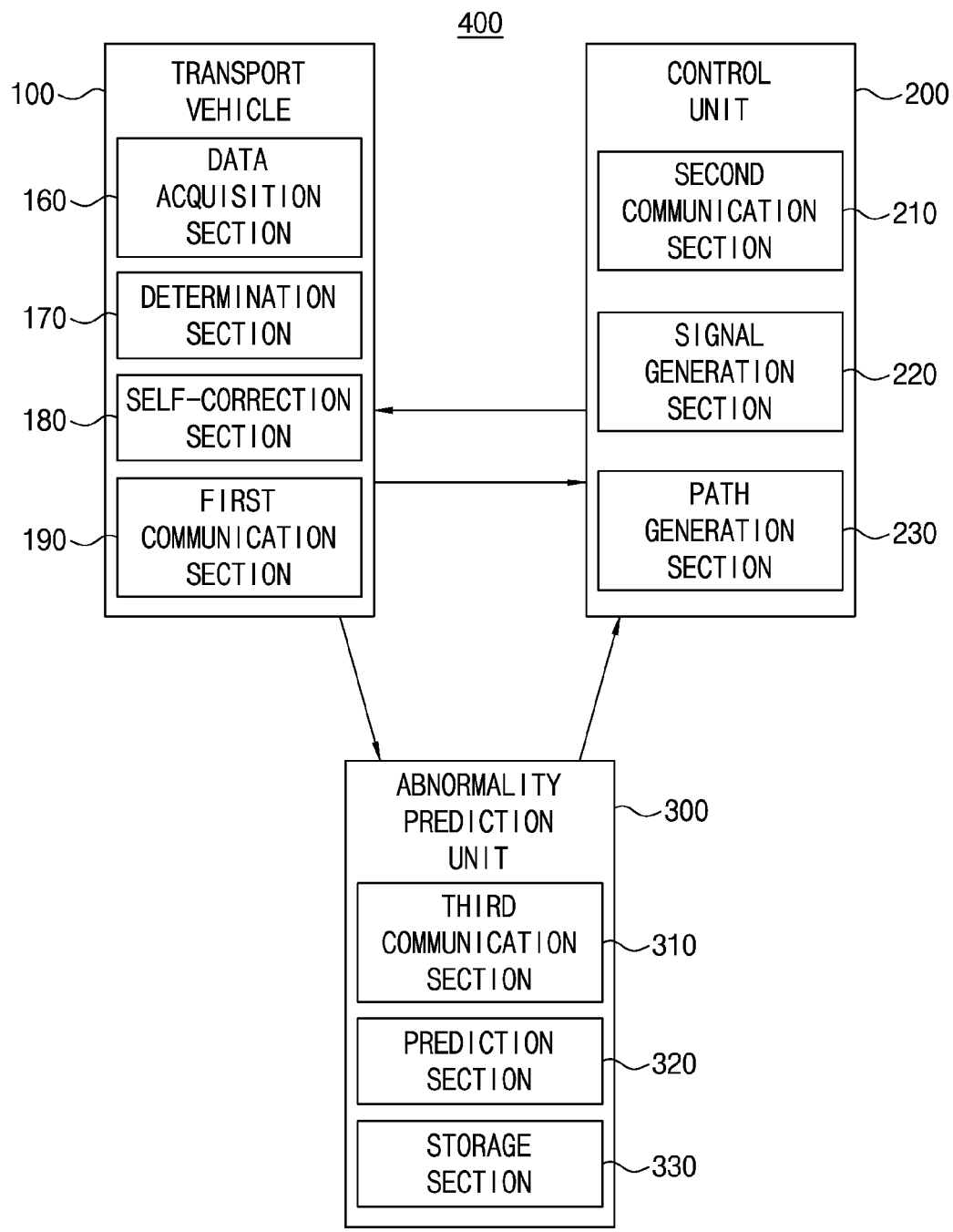
FIG. 1 is a block diagram illustrating a material transport apparatus in accordance with an embodiment of the present invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Hereinafter, embodiments of the present invention are described in more detail with reference to the accompanying drawings. However, the present invention is not limited to the embodiments described below and is implemented in various other forms. Embodiments below are not provided to fully complete the present invention but rather are provided to fully convey the range of the present invention to those skilled in the art.

In the specification, when one component is referred to as being on or connected to another component or layer, it can be directly on or connected to the other component or layer, or an intervening component or layer may also be present.

Unlike this, it will be understood that when one component is referred to as directly being on or directly connected to another component or layer, it means that no intervening component is present. Also, though terms like a first, a second, and a third are used to describe various regions and layers in various embodiments of the present invention, the regions and the layers are not limited to these terms.

Terminologies used below are used to merely describe specific embodiments, but do not limit the present invention. Additionally, unless otherwise defined here, all the terms including technical or scientific terms, may have the same meaning that is generally understood by those skilled in the art.

Embodiments of the present invention are described with reference to schematic drawings of ideal embodiments. Accordingly, changes in manufacturing methods and/or allowable errors may be expected from the forms of the drawings. Accordingly, embodiments of the present invention are not described being limited to the specific forms or areas in the drawings, and include the deviations of the forms. The areas may be entirely schematic, and their forms may not describe or depict accurate forms or structures in any given area, and are not intended to limit the scope of the present invention.

Figure 2:
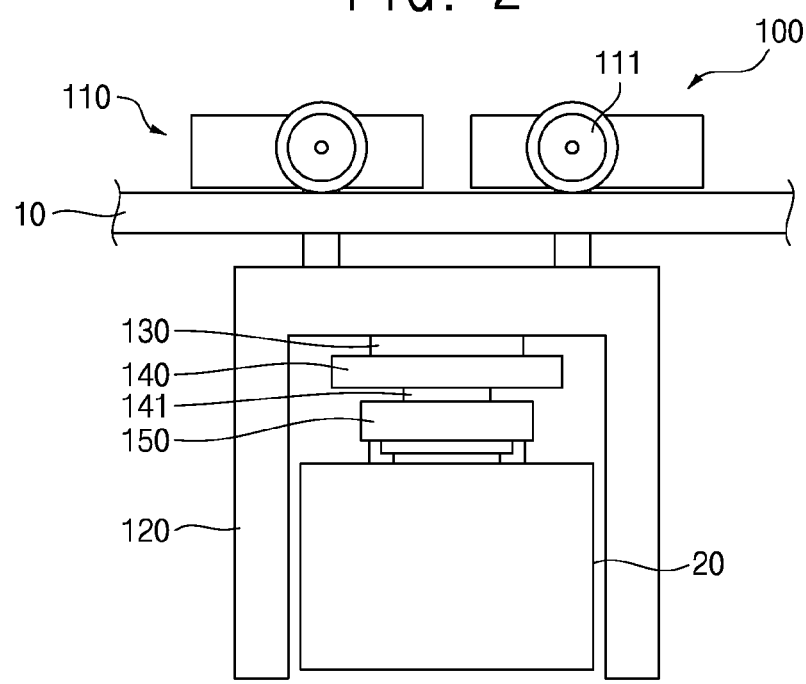
FIG. 2 is a schematic view illustrating a transport vehicle as shown in FIG. 1.
Figure 3:
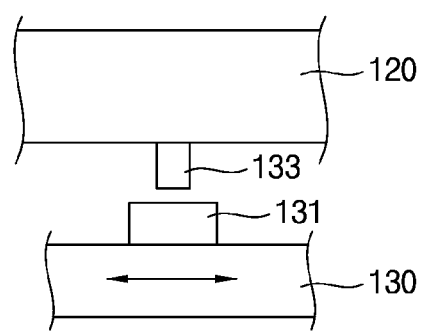
FIG. 3 is a schematic view illustrating a dog bar mounted on a slide unit and a home sensor mounted on a frame unit as shown in FIG. 2.

FIG. 1 is a block diagram illustrating a material transport apparatus in accordance with an embodiment of the present invention, FIG. 2 is a schematic view illustrating a transport vehicle as shown in FIG. 1, and FIG. 3 is a schematic view illustrating a dog bar mounted on a slide unit and a home sensor mounted on a frame unit as shown in FIG. 2.

Referring to FIGS. 1 and 2, a material transport apparatus 400, in accordance with an embodiment of the present invention, may include a transport vehicle 100 configured to be movable along a transport rail 10 and configured to transport a material 20, a control unit 200 for controlling a movement operation of the transport vehicle 100 and loading and unloading operations of the material 20, and an abnormality prediction unit 300 for predicting whether an abnormality will occur in the transport vehicle 100. For example, the transport vehicle 100 may transport a material 20 such as a cassette for accommodating semiconductor substrates, a magazine for accommodating printed circuit boards or lead frames, and a reticle pod for accommodating a reticle.

The transport vehicle 100 may include a drive unit 110, a frame unit 120, a slide unit 130, a hoist unit 140, and a hand unit 150.

For example, a pair of drive units 110 may be disposed on the transport rail 10, and the frame unit 120 may be connected to lower portions of the drive units 110. Each of the drive units 110 may include drive wheels 111 and a drive motor (not shown) for rotating the drive wheels 111. The frame unit 120 may have a space for accommodating the material 20, and a lower portion of the frame unit 120 may be opened for vertical movement of the material 20. Further, one side or both sides of the frame unit 120 may be opened for horizontal movement of the material 20.

The slide unit 130 may be disposed in the frame unit 120, and the slide unit 130 may be configured to be movable in a horizontal direction perpendicular to a moving direction of the drive units 110 through the open side portions of the frame unit 120.

The transport vehicle 100 may include a dog bar 131 and a home sensor 133 for detecting a home position of the slide unit 130. The dog bar 131 may be mounted on the slide unit 130, and the home sensor 133 may be mounted on the frame unit 120 to detect the dog bar 131. The dog bar 131 may have a predetermined length in the horizontal direction, and the home sensor 133 may be disposed above the dog bar 131 in order to detect the dog bar 131.

The hoist unit 140 may move the hand unit 150 in a vertical direction using a belt 141, and the hand unit 150 may include a gripper for gripping the material 20. The hoist unit 140 may be mounted on a lower portion of the slide unit 130, and may be moved in the horizontal direction by the slide unit 130. Further, although not shown, the hoist unit 140 or the hand unit 150 may be configured to be rotatable.

In addition, although not shown in figures, the transport vehicle 100 may include an obstacle sensor and a front distance sensor mounted on the frame unit 120, sensors for detecting a movement operation of the transport vehicle 100 and loading and unloading operations of the material 20, a position sensor for detecting a position of the transport vehicle 100 on the transport rail 10, and a code reader for detecting a barcode or QR code attached to the transport rail 10.

In accordance with an embodiment of the present invention, the transport vehicle 100 may include a data acquisition section 160, a determination section 170, a self-correction section 180, and a first communication section 190.

The data acquisition section 160 may acquire operation data on the movement operation and the loading and unloading operations of the transport vehicle 100. For example, the operation data may be acquired from the sensors, and the data acquisition section 160 may generate a log file related to the movement operation and the loading and unloading operations.

Specifically, the operation data on the movement operation may be data on an operation of the drive unit 110 of the transport vehicle 100. The operation data on the loading and unloading operations may be data on operations of the slide unit 130, the hoist unit 140, and the hand unit 150 of the transport vehicle 100.

The operation data may include a home position and left and right limit adjustment state of the slide unit 130, a deviation between a home position of the hoist unit 140 and a position of the hoist unit 140, an operation time and sensor detection state of the hand unit 150, a distortion and input/output of an obstacle sensor and a front distance sensor mounted on the frame unit 120, and a sensing distance of the sensors for a movement of the drive unit 110 and loading and unloading of the material 20, a recognition rate of barcode or QR code of a code reader mounted on the frame unit 120, and a wear state of drive wheels 111 of the drive unit 110.

The determination section 170 may determine whether there is an abnormality in the movement operation and the loading and unloading operations on the basis of the operation data acquired by the data acquisition section 160. Further, when there is an abnormality in the movement operation or the loading and unloading operations, the determination section 170 may generate a first movement signal to move the transport vehicle 100 to a self-testing area (not shown) connected to the transport rail 10.

The determination section 170 may check whether the drive unit 110, the slide unit 130, the hoist unit 140, and the hand unit 150 normally operate based of the operation data acquired by the data acquisition section 160. For example, the determination section 170 may compare values measured by the sensors with predetermined reference values.

In particular, when difference values between the measured values and the reference values satisfy an allowable range, the determination section 170 may determine that the movement operation and the loading and unloading operations of the transport vehicle 100 are normal. Further, when the difference values between the measured values and the reference values are out of the allowable range, the determination section 170 may determine that an abnormality has occurred in the movement operation and/or the loading and unloading operations of the transport vehicle 100.

When it is determined that there is an abnormality in the movement operation and the loading and unloading operations of the transport vehicle 100, the determination section 170 may generate the first movement signal for moving the transport vehicle 100 to the self-testing area. As another example, when an abnormality occurs in the drive unit 110, it may be impossible to move the transport vehicle 100. In such case, the determination section 170 may notify the operator of the abnormality of the transport vehicle 100 by generating an alarm signal.

After the transport vehicle 100 moves to the self-testing area, the determination section 170 may self-test whether there is an abnormality in the transport vehicle 100. For example, the determination section 170 may determine again whether the movement operation and the loading and unloading operations are abnormal based on the operation data acquired by the data acquisition section 160.

When it is determined that there is no abnormality in the transport vehicle 100 as a result of the self-inspection, the determination section 170 may generate a return signal for moving the transport vehicle 100 to the transport rail 10.

When an abnormality is detected in the transport vehicle 100, the determination section 170 may check whether the abnormality can be self-corrected. When the abnormality cannot be self-corrected, the determination section 170 may generate a take-out signal to take out the transport vehicle 100 to the outside. Alternatively, when the abnormality can be self-corrected, the self-correction section 180 may self-correct the abnormality. In addition, after the self-correction is performed, the determination section 170 may generate a return signal for returning the transport vehicle 100 to the transport rail 10.

The first communication section 190 may transmit the first movement signal, the alarm signal, the return signal, and the take-out signal to the control unit 200. Also, the first communication section 190 may transmit the operation data acquired by the data acquisition section 160 to the abnormality prediction unit 300.

The control unit 200 may include a second communication section 210, a signal generation section 220, and a path generation section 230.

The second communication section 210 may be configured to enable wireless communication with the first communication section 190, and may receive the first movement signal, the alarm signal, the return signal and the take-out signal from the first communication section 190.

When the first movement signal is transmitted from the first communication section 190 to the second communication section 210, the signal generation section 220 may generate a first control signal for moving the transport vehicle 100 to the self-testing area, and the second communication section 210 may transmit the first control signal to the transport vehicle 100. Further, when the return signal is transmitted from the first communication section 190 to the second communication section 210, the signal generation section 220 may generate a second control signal for returning the transport vehicle 100 onto the transport rail 10, and the second communication section 210 may transmit the second control signal to the transport vehicle 100.

Meanwhile, a take-out port (not shown) for taking out the transport vehicle 100 from the transport rail 10 to the outside may be connected to the transport rail 10. When the take-out signal is transmitted from the first communication section 190 to the second communication section 210, the signal generation section 220 may generate a third control signal for moving the transport vehicle 100 from the self-testing area to the take-out port, and the second communication section 210 may transmit the third control signal to the transport vehicle 100.

When the alarm signal is transmitted from the first communication section 190 to the second communication section 210, the signal generation section 220 may generate a second alarm signal to notify the operator of the abnormality of the transport vehicle 100. For example, the signal generation section 220 may turn on a warning light or generate a buzzer sound.

When an abnormality occurs in the transport vehicle 100 as described above, the self-test and the self-correction of the transport vehicle 100 may be performed automatically. Further, when the self-correction of the abnormality is not possible, the transport vehicle 100 may be automatically taken out. Accordingly, the time and cost required for the management of the transport vehicle 100 may be significantly reduced, and the operation rate of the transport vehicle 100 may be greatly improved.

The path generation section 230 may generate a movement path of the transport vehicle 100. For example, when the second communication section 210 receives the first movement signal from the first communication section 190, the path generation section 230 may generate a first movement path from a current position of the transport vehicle 100 to the self-testing area. In this case, the current position information of the transport vehicle 100 may be received from the first communication section 190 together with the first movement signal, and the generated information on the first movement path may be transmitted to the transport vehicle 100 by the second communication section 210.

When the second communication section 210 receives the return signal from the first communication section 190, the path generation section 230 may generate a second movement path from the self-testing area to a predetermined position for the transport of the material, and the second communication section 210 may transmit information on the generated second movement path to the transport vehicle 100.

Further, when the second communication section 210 receives the take-out signal from the first communication section 190, the path generation section 230 may generate a third movement path from the self-testing area to the take-out port, and the second communication section 210 may transmit information on the generated third movement path to the transport vehicle 100.

The abnormality prediction unit 300 may include a third communication section 310, a prediction section 320, and a storage section 330.

The third communication section 310 may receive the operation data acquired by the data acquisition section 160 from the first communication section 190, and the prediction section 320 may predict whether an abnormality will occur in the transport vehicle 100 using the received operation data.

The storage section 330 may store reference operation data of a plurality of reference transport vehicles, and the prediction section 320 may compare the received operation data with the reference operation data to predict an occurrence of an abnormality in the transport vehicle 100.

For example, data on how the reference operation data of each of the reference transport vehicles changes for a predetermined time may be stored in the storage section 330. The prediction section 320 may select reference operation data equal or similar to the received operation data by comparing the received operation data with the reference operation data.

Further, the prediction section 320 may check how the selected reference operation data changes during a predetermined time so as to predict the occurrence of abnormality in the transport vehicle 100. For example, when a reference transport vehicle having the selected reference operation data operates normally for the predetermined time, the prediction section 320 may predict that the transport vehicle 100 will maintain a normal operating state for the predetermined time.

As another example, when an abnormality occurs within the predetermined time in the reference transport vehicle having the selected reference operation data, the prediction section 320 may predict that an abnormality will occur within the predetermined time in the transport vehicle 100.

In particular, when it is predicted that an abnormality will occur in the transport vehicle 100, the prediction section 320 may generate a second movement signal for moving the transport vehicle 100 to the self-testing area, and the third communication section 310 may transmit the second movement signal to the second communication section 210. Further, the third communication section 310 may receive a current position information of the transport vehicle 100 from the first communication section 190, and may transmit the current position information of the transport vehicle 100 to the second communication section 210. In this case, the signal generation section 220 may generate a fourth control signal for moving the transport vehicle 100 to the self-testing area, and the second communication section 210 may transmit the fourth control signal to the transport vehicle 100. Further, the path generation section 230 may generate a fourth movement path from the current position of the transport vehicle 100 to the self-testing area, and the second communication section 210 may transmit information on the generated fourth movement path to the transport vehicle 100.

The transport vehicle 100 may move to the self-testing area using the fourth control signal and the fourth movement path, and then, the determination section 170 may self-test whether there is an abnormality in the transport vehicle 100.

On the other hand, the third communication section 310 may periodically receive the operation data from the transport vehicle 100, and the storage section 330 may store the received operation data. The operation data stored periodically as described above may be used as the reference operation data.

Figure 4:
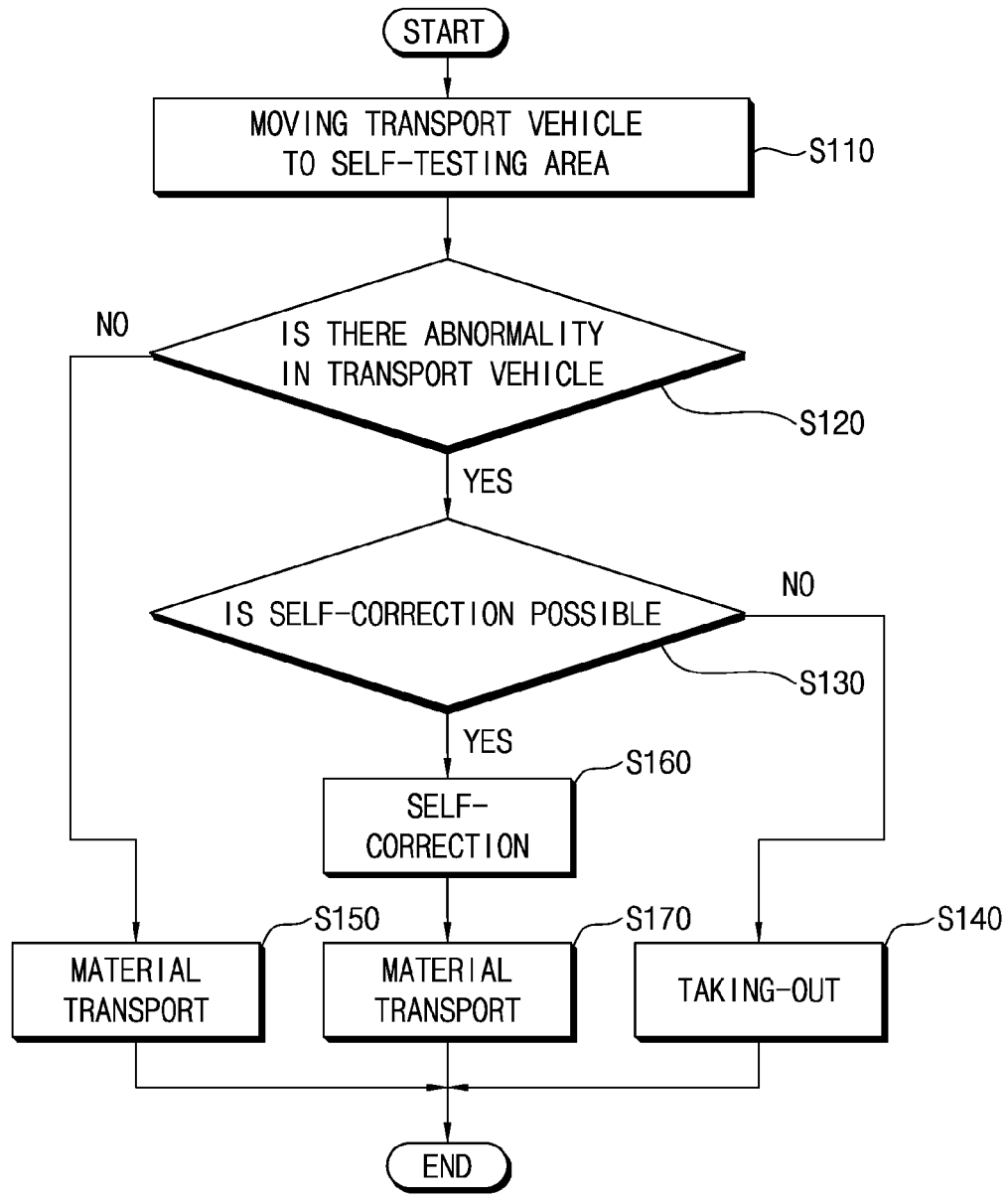
FIG. 4 is a flowchart illustrating a transport vehicle management method in accordance with an embodiment of the present invention.

FIG. 4 is a flowchart illustrating a transport vehicle management method in accordance with an embodiment of the present invention.

Referring to FIG. 4, in step S110, the transport vehicle 100 may be moved to the self-testing area connected to the transport rail 10. Then, in step S120, the transport vehicle 100 may be self-tested to determine whether there is an abnormality in the transport vehicle 100.

For example, while the transport vehicle 100 is operating, the data acquisition section 160 may generate a log file including operation data of the transport vehicle 100 by using values measured by the sensors mounted on the transport vehicle 100. The determination section 170 may analyze the log file to determine whether there is an abnormality in the operations of the transport vehicle 100. As an example, when a position control of the slide unit 130 is not precise, that is, when a difference value between position coordinates of the slide unit 130 moved for loading or unloading of the material and predetermined position coordinates is out of an allowable range, the determination section 170 may determine that an abnormality has occurred in the operations of the transport vehicle 100, and may generate a first movement signal for moving the transport vehicle 100 to the self-testing area.

The first movement signal may be transmitted to the second communication section 210 of the control unit 200 by the first communication section 190, and the signal generation section 220 of the control unit 200 may generate a first control signal for moving the transport vehicle 100 to the self-testing area. Further, the path generation section 230 may generate a first movement path from a current position of the transport vehicle 100 to the self-testing area, and the second communication section 210 may transmit the first control signal and information on the first movement path to the transport vehicle 100.

As another example, when the prediction section 320 of the abnormality prediction unit 300 predicts that an abnormality will occur in the transport vehicle 100, the transport vehicle 100 may move to the self-testing area. Alternatively, the transport vehicle 100 may periodically move to the self-testing area.

After the transport vehicle 100 moves to the self-testing area, the determination section 170 may self-test a home position and left and right limit adjustment state of the slide unit 130, a deviation between a home position of the hoist unit 140 and a position of the hoist unit 140, an operation time and sensor detection state of the hand unit 150, a distortion and input/output of an obstacle sensor and a front distance sensor mounted on the frame unit 120, and a sensing distance of the sensors for a movement of the drive unit 110 and loading and unloading of the material 20, a recognition rate of barcode or QR code of a code reader mounted on the frame unit 120, and a wear state of drive wheels 111 of the drive unit 110.

In step S130, when an abnormality is detected in the transport vehicle 100, the determination section 170 may determine whether the transport vehicle 100 is capable of self-correcting the detected abnormality. For example, when a position error occurs in an operation of the slide unit 130, the determination section 170 may determine whether the position error of the slide unit 130 is self-correctable.

A dog bar 131 may be mounted on the slide unit 130, and a home sensor 133 for detecting the dog bar 131 may be mounted on the frame unit 120. For example, the dog bar 131 may be detected by the home sensor 133 while the slide unit 130 is moved in a horizontal direction. In particular, a distance that the slide unit 130 moves during a time that the dog bar 131 is detected by the home sensor 133 is a total length of the dog bar 131, and the determination section 170 may determine whether the self-correction is possible by comparing the total length of the dog bar 131 with a predetermined reference length.

Specifically, when the total length of the dog bar 131 is different from the reference length, a failure may have occurred in the home sensor 133, or damage may have occurred to the dog bar 131. Accordingly, the determination section 170 may determine that the position error of the slide unit 130 cannot be self-corrected. In this case, the determination section 170 may generate a take-out signal for taking out the transport vehicle 100 to the outside, and the transport vehicle 100 may be taken out from the self-testing area in step S140. As another example, when the total length of the dog bar 131 is equal to the reference length, the determination section 170 may determine that the position error of the slide unit 130 is self-correctable.

Further, a left length that the dog bar 131 is detected may be measured while the slide unit 130 is moved from a predetermined home position in a right direction, and a right length that the dog bar 131 is detected may be measured while the slide unit 130 is moved from the predetermined home position in a left direction. The determination section 170 may compare the measured left length with the measured right length. As a result of the comparison, when the measured left length is equal to the measured right length, the determination section 170 may determine that the operating state of the slide unit 130 is normal. In such case, the determination section 170 may generate a return signal for returning the transport vehicle 100 onto the transport rail 10, and the transport vehicle 100 may return to the transport rail 10 from the self-testing area for material transport in step S150.

On the other hand, when the measured left length and the measured right length are different from each other, the self-correction section 180 may correct the home position of the slide unit 130 so that the left length and the right length of the dog bar 131 are equal to each other in step S160.

After the self-correction is performed, the determination section 170 may generate a return signal for returning the transport vehicle 100 to the transport rail 10, and the transport vehicle 100 may return to the transport rail 10 from the self-testing area for material transport in step S170.

Figure 5:
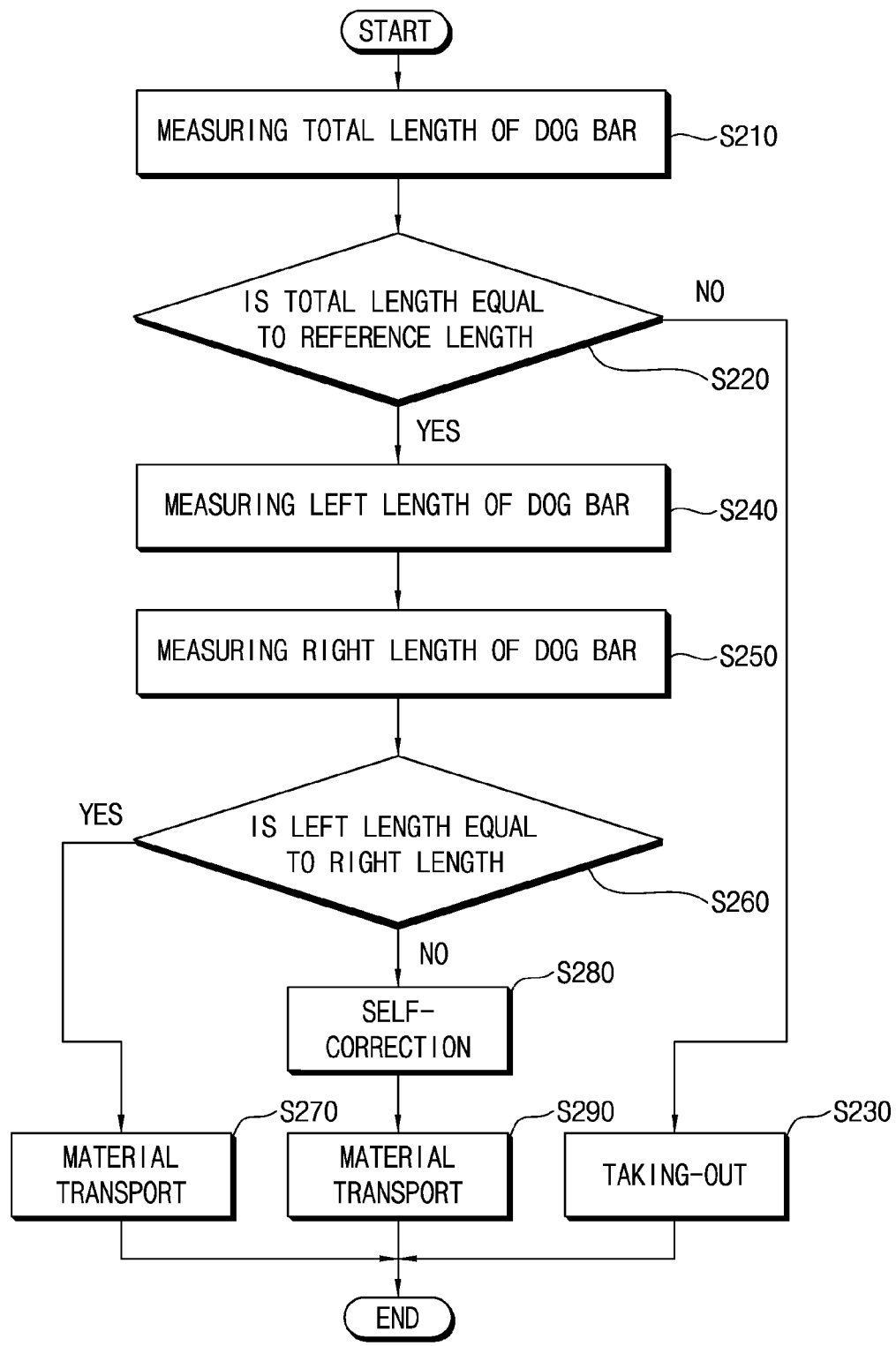
FIG. 5 is a flowchart illustrating a transport vehicle management method in accordance with another embodiment of the present invention.
Figure 6:
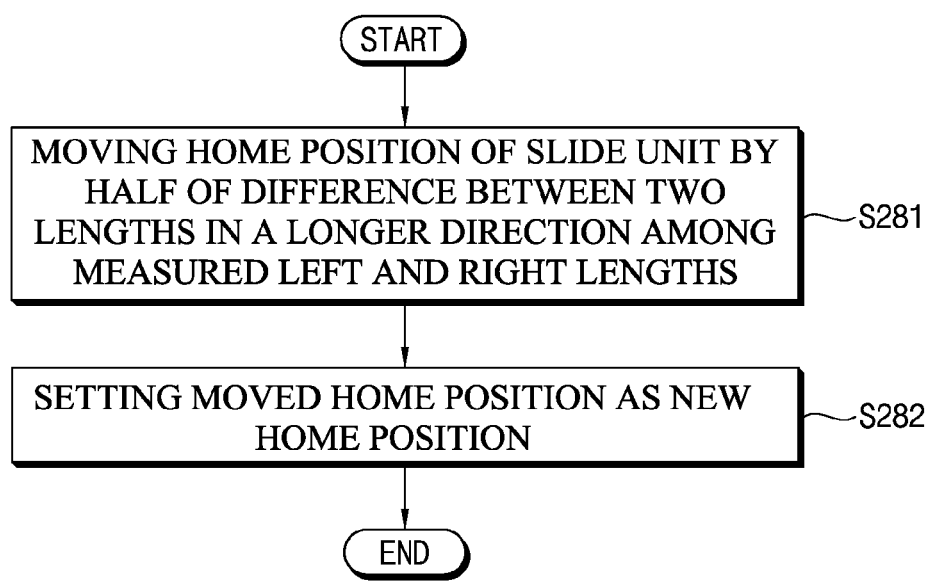
FIG. 6 is a flowchart illustrating a self-correcting step as shown in FIG. 5.

FIG. 5 is a flowchart illustrating a transport vehicle management method in accordance with another embodiment of the present invention, and FIG. 6 is a flowchart illustrating a self-correcting step as shown in FIG. 5.

Referring to FIGS. 5 and 6, a transport vehicle management method, in accordance with another embodiment of the present invention, may be used to correct a position error of the slide unit 130 of the transport vehicle 100 when the position error occurs in the slide unit 130. As shown in FIG. 3, a dog bar 131 may be mounted on the slide unit 130, and a home sensor 133 for detecting the dog bar 131 may be mounted on the frame unit 120 of the transport vehicle 100.

In accordance with another embodiment of the present invention, in step S210, a total length of the dog bar 131 may be measured. For example, the total length of the dog bar 131 detected by the home sensor 133 may be measured while the slide unit 130 is moved in the horizontal direction.

Specifically, the total length of the dog bar 131 may be a distance that the slide unit 130 moves while the dog bar 131 is detected by the home sensor 133. As an example, the slide unit 130 may be moved in the horizontal direction by a driving section (not shown) such as a motor, and an encoder for measuring the number of revolutions of the motor may be mounted on the motor. The moving distance of the slide unit 130 may be calculated based on a signal of the encoder.

In step S220, the determination section 170 may determine whether the total length of the dog bar 131 is equal to a predetermined reference length. When the total length of the dog bar 131 is different from the reference length, it may be determined that a failure has occurred in the home sensor 133 or damage has occurred in the dog bar 131. Accordingly, the determination section 170 may determine that the position error of the slide unit 130 cannot be self-corrected. In such case, the determination section 170 may generate a take-out signal for taking out the transport vehicle 100 to the outside, and the transport vehicle 100 may be taken out from the self-testing area in step S230.

When the total length of the dog bar 131 is equal to the reference length, a left length of the dog bar 131 may be measured in step S240, and a right length of the dog bar 131 may be measured in step S250. For example, after moving the slide unit 130 to a predetermined home position, the left length of the dog bar 131 may be acquired by measuring a moving distance of the slide unit 130 that the dog bar 131 is detected by the home sensor 133 while moving the slide unit 130 in a right direction. Further, after moving the slide unit 130 to the predetermined home position, the right length of the dog bar 131 may be acquired by measuring a moving distance of the slide unit 130 that the dog bar 131 is detected by the home sensor 133 while moving the slide unit 130 in a left direction.

In step S260, the determination section 170 may compare the measured left length and the measured right length of the dog bar 131 with each other. When the measured left length and the measured right length are equal to each other as a result of the comparison, the determination section 170 may determine that the operating state of the slide unit 130 is normal. In such case, the determination section 170 may generate a return signal for returning the transport vehicle 100 onto the transport rail 10, and the transport vehicle 100 may return onto the transport rail 10 from the self-testing area for material transport in step S270.

When the measured left length and the measured right length are different from each other, the self-correction section 180 may correct the home position of the slide unit 130 so that the left length and the right length of the dog bar 131 are equal to each other in step S280. Specifically, as shown in FIG. 6, in step S281, the determination section 170 may move the home position of the slide unit 130 by half of the difference between the two lengths in a longer direction among the measured left length and the measured right length. In step S282, the determination section 170 may set the moved home position as a new home position.

After correcting the home position of the slide unit 130, the determination section 170 may generate a return signal for returning the transport vehicle 100 onto the transport rail 10, and the transport vehicle 100 may return onto the transport rail 10 from the self-testing area for material transport in step S290.

In accordance with the embodiments of the present invention as described above, when an abnormality occurs in the transport vehicle 100, the abnormality may be detected by self-test and may then be self-corrected. Accordingly, the time and cost required for managing the transport vehicle 100 may be significantly reduced.

Although the example embodiments of the present invention have been described with reference to the specific embodiments, they are not limited thereto. Therefore, it will be readily understood by those skilled in the art that various modifications and changes can be made thereto without departing from the spirit and scope of the appended claims.

The invention claimed is:

1. A transport vehicle management method comprising:
    self-testing a transport vehicle to determine whether there is an abnormality in the transport vehicle;
    checking whether the transport vehicle is capable of self-correcting the abnormality when the abnormality is detected in the transport vehicle, wherein the transport vehicle is configured to be movable on a transport rail;
    self-correcting the abnormality when the transport vehicle is capable of self-correcting the abnormality; and
    moving the transport vehicle to a self-testing area connected to the transport rail.

2. The transport vehicle management method of claim 1, further comprising transporting a material using the transport vehicle after self-correcting the abnormality.

3. The transport vehicle management method of claim 1, further comprising transporting a material using the transport vehicle when the abnormality is not detected in the transport vehicle.

4. The transport vehicle management method of claim 1, wherein the self-testing the transport vehicle is performed in the self-testing area.

5. The transport vehicle management method of claim 4, further comprising taking out the transport vehicle from the self-testing area when the abnormality cannot be self-corrected.

6. A transport vehicle management method comprising:
    self-testing a transport vehicle to determine whether there is an abnormality in the transport vehicle;
    checking whether the transport vehicle is capable of self-correcting the abnormality when the abnormality is detected in the transport vehicle; and
    self-correcting the abnormality when the transport vehicle is capable of self-correcting the abnormality,
    wherein the transport vehicle comprises:
    a drive unit configured to be movable on a transport rail;
    a hand unit for gripping a material;
    a hoist unit for elevating the hand unit;
    a slide unit for moving the hoist unit in a horizontal direction; and
    a frame unit connected to a lower portion of the drive unit and on which the slide unit is mounted to be movable in the horizontal direction.

7. The transport vehicle management method of claim 6, wherein at least one selected from the group consisting of a home position and left and right limit adjustment state of the slide unit, a deviation between a home position of the hoist unit and a position of the hoist unit, an operation time and sensor detection state of the hand unit, a distortion and input/output of an obstacle sensor and a front distance sensor mounted on the frame unit, and a sensing distance of the sensors for a movement of the drive unit and loading and unloading of the material, a recognition rate of barcode or QR code of a code reader mounted on the frame unit, and a wear state of drive wheels of the drive unit is self-tested.

8. The transport vehicle management method of claim 6, wherein when a position error of the slide unit is detected by self-testing an operating state of the slide unit, it is determined that the abnormality has occurred in the transport vehicle.

9. The transport vehicle management method of claim 6, wherein a dog bar is mounted on the slide unit, and a home sensor for detecting the dog bar is mounted on the frame unit.

10. The transport vehicle management method of claim 9, wherein the self-testing the transport vehicle comprises:
   measuring a total length of the dog bar using the home sensor while moving the slide unit in the horizontal direction;
   measuring a left length of the dog bar while moving the slide unit in a right direction from a predetermined home position; and
   measuring a right length of the dog bar while moving the slide unit in a left direction from the predetermined home position.

11. The transport vehicle management method of claim 10, further comprising taking out the transport vehicle when the measured total length is different from a predetermined reference length.

12. The transport vehicle management method of claim 10, wherein when the measured total length is equal to a predetermined reference length and the measured left length is different from the measured right length, the home position of the slide unit is corrected so that a left length and a right length of the dog bar are equal to each other.

13. A transport vehicle management method of managing a transport vehicle comprising a drive unit configured to be movable on a transport rail, a hand unit for gripping a material, a hoist unit for elevating the hand unit, a slide unit for moving the hoist unit in a horizontal direction, a frame unit connected to a lower portion of the drive unit and on which the slide unit is mounted to be movable in the horizontal direction, a dog bar mounted on the slide unit, and a home sensor mounted on the frame unit and configured to detect the dog bar, the transport vehicle management method comprising:
   measuring a total length of the dog bar using the home sensor while moving the slide unit in the horizontal direction; and
   taking out the transport vehicle when the measured total length is different from a predetermined reference length.

14. The transport vehicle management method of claim 13, further comprising:
   measuring a left length of the dog bar while moving the slide unit in a right direction from a predetermined home position; and
   measuring a right length of the dog bar while moving the slide unit in a left direction from the predetermined home position.

15. The transport vehicle management method of claim 14, further comprising transporting the material using the transport vehicle when the measured total length is equal to the predetermined reference length and the measured left length is equal to the measured right length.

16. The transport vehicle management method of claim 14, further comprising correcting the home position of the slide unit so that a left length and a right length of the dog bar are equal to each other when the measured total length is equal to the predetermined reference length and the measured left length is different from the measured right length.

* * * * *